(12) United States Patent
Salz et al.

(10) Patent No.: US 7,472,950 B2
(45) Date of Patent: Jan. 6, 2009

(54) ROOF FOR A MOTOR VEHICLE

(75) Inventors: Wolfram Salz, Sachsenheim (DE);
Thomas Halbweiss, Remseck (DE);
Matthias Rösler, Stuttgart (DE)

(73) Assignee: Magna Car Top Systems GmbH,
Bietigheim-Bissingen (DE)

( * ) Notice: Subject to any disclaimer, the term of this patent is extended or adjusted under 35 U.S.C. 154(b) by 0 days.

(21) Appl. No.: 11/620,258

(22) Filed: Jan. 5, 2007

(65) Prior Publication Data

US 2007/0152476 A1    Jul. 5, 2007

(30) Foreign Application Priority Data

Jan. 5, 2006   (DE) ................. 10 2006 000 847

(51) Int. Cl.
*B60J 10/12*   (2006.01)
(52) U.S. Cl. ................................. 296/216.06
(58) Field of Classification Search ..... 296/216.01–224
See application file for complete search history.

(56) References Cited

U.S. PATENT DOCUMENTS 2,201,330 A * 5/1940 Wernig et al. ............... 292/48
2,245,832 A * 6/1941 Simpson ...................... 296/222
2,338,225 A * 1/1944 Ball ............................. 296/222
3,975,048 A * 8/1976 Matusek .................. 296/216.01
4,241,948 A    12/1980 Mori
5,039,161 A     8/1991 Schmidhuber et al.

FOREIGN PATENT DOCUMENTS

| DE | 36 44 493 A1 | 7/1987 | |
| DE | 38 40 491 C1 | 4/1990 | |
| FR | 1564790 | * 4/1969 | ............ 296/216.02 |
| FR | 2692849 | * 12/1993 | ............ 296/216.02 |
| JP | 405278468 | * 10/1993 | ............ 296/216.03 |

* cited by examiner

*Primary Examiner*—Dennis H Pedder
(74) *Attorney, Agent, or Firm*—Brooks Kushman P.C.

(57) ABSTRACT

A vehicle includes a roof having a roof opening between respective sides of the vehicle body, and guide rails attached to respective sides of the vehicle body. A cover having guide elements is slidably engaged to respective ones of the rails to slide the cover between a closed position in which the cover covers the opening and an opened position in which the cover exposes the opening. A first sealing section is connected to one of the respective vehicle body sides. A second sealing section is connected to the cover on the respective body side. The sealing sections enclose a wedge line. A seal is between the sealing sections. The seal is compressed when the cover is in the closed position and is relaxed when the cover is in the opened position in response to a wedge effect generated by the wedge line as the cover slides along the rails.

6 Claims, 2 Drawing Sheets

ROOF FOR A MOTOR VEHICLE

CROSS-REFERENCE TO RELATED APPLICATIONS

This application claims foreign priority benefits under 35 U.S.C. § 119(a)-(d) to DE 10 2006 000 847.2, filed Jan. 5, 2006, which is hereby incorporated by reference in its entirety.

BACKGROUND OF THE INVENTION

1. Field of the Invention

The present invention relates to a slidable vehicle roof panel for closing and opening a roof opening formed in the roof of a motor vehicle.

2. Background Art

DE 36 44 493 A1 describes a slidable roof panel for closing and opening a roof opening formed in the roof of a vehicle. A pair of guide elements are on respective sides of the roof panel. The guide elements respectively engage guide rails on respective sides of the roof to enable the roof panel to be longitudinally displaced thereby closing and opening the roof opening. The roof panel cooperates with sealing bodies secured in the roof opening.

U.S. Pat. No. 4,241,948 describes a slidable roof panel for closing and opening a roof opening formed in the roof of a vehicle. The roof panel can be slid along a pair of guide rails provided on opposite sides of the roof opening to extend in the longitudinal direction thereof thereby closing and opening the roof opening. The roof panel is contained in a space provided within the roof when the roof panel opens the roof opening. The roof and an inner panel secured thereto define the space to have a volume sufficient to locate the guide rails and permit the slidable movements of the roof panel into and out of the space.

SUMMARY OF THE INVENTION

An object of the present invention is a slidable roof panel for closing and opening a roof opening formed in the roof of a motor vehicle in which the roof panel has a relatively simple design, a functionally correct sliding motion while being longitudinally displaced to close and open the roof opening, and an ideal sealing effect with the roof opening.

Another object of the present invention is a motor vehicle having such a slidable roof panel.

In carrying out the above objects and other objects, the present invention provides a roof panel assembly for a vehicle. The roof panel assembly includes a roof panel having first and second guide elements located on respective first and second sides of the roof panel. The guide elements are respectively engageable to first and second guide rails attached to respective first and second sides of a roof of a vehicle to enable the roof panel to slide over and away from a roof opening between the first and second sides of the roof to close and open the roof opening. The roof panel assembly further includes first and second sealing bodies, and first and second pairs of first and second sealing sections. The first sealing section of the first pair of sealing sections is fixedly connectable to the first side of the roof and the second sealing section of the first pair of sealing sections is connected to the first side of the roof panel. The sealing sections of the first pair of sealing sections enclose a first wedge line. The first sealing section of the second pair of sealing sections is fixedly connectable to the second side of the roof and the second sealing section of the second pair of sealing sections is connected to the second side of the roof panel. The sealing sections of the second pair of sealing sections enclose a second wedge line. The first sealing body is between the sealing sections of the first pair of sealing sections and the second sealing body is between the sealing sections of the second pair of sealing sections. The sealing bodies assume a working position when the roof panel closes the roof opening and assume a resting position when the roof panel opens the roof opening in response to a wedge effect generated by the wedge lines as the roof panel slides along the guide rails.

Further, in carrying out the above objects and other objects, the present invention provides a vehicle. The vehicle includes a roof having a roof opening between respective sides of the vehicle body. Guide rails are attached to respective sides of the vehicle body. A cover having guide elements is slidably engaged to respective ones of the guide rails to slide the cover between a closed position in which the cover covers the roof opening and an opened position in which the cover exposes the roof opening. A vertically oriented first sealing section is connected to one of the respective sides of the vehicle body. A vertically oriented second sealing section is connected to the cover on the respective side of the vehicle body. The sealing sections enclose a wedge line. A sealing body is between the sealing sections. The sealing body is compressed when the cover is in the closed position and is relaxed when the cover is in the opened position in response to a wedge effect generated by the wedge line as the cover slides along the guide rails.

In an embodiment of the present invention, sealing bodies situated on respective sides of the roof panel (i.e., the cover) between the roof panel and the vehicle body, i.e., between vertical first and second sealing sections, assume either a working position or a resting position as a result of longitudinal motion of the roof panel via parallel guide rails running along the sides of the vehicle body and by a wedge effect produced by wedge lines. Each sealing body fulfills a defined sealing function when the roof panel is in the working position. The sealing bodies are relaxed when the roof panel is in the resting position. The first sealing section is fixedly attached to the vehicle body and runs, for example, along one of the wedge lines. The second sealing section is fixed to the roof panel. For this purpose, as viewed from above on the roof panel, the second sealing section extends at an acute angle with respect to a longitudinal plane running parallel to a center longitudinal plane of the vehicle body.

In an embodiment of the present invention, when a sealing body is held in position on the first sealing section, the first sealing section is a component of a support of the vehicle body. The support has an approximately U-shaped basic shape. The support is configured to accommodate the guide rail.

In an embodiment of the present invention, an inner support structure is connected to the cover. The inner support structure includes an angled element whose free end together with a sliding profile projects into a U-shaped receptacle in the guide rail.

The above features, and other features and advantages of the present invention as readily apparent from the following detailed descriptions thereof when taken in connection with the accompanying drawings.

DETAILED DESCRIPTION OF THE PREFERRED EMBODIMENT(S)

Figure 1:
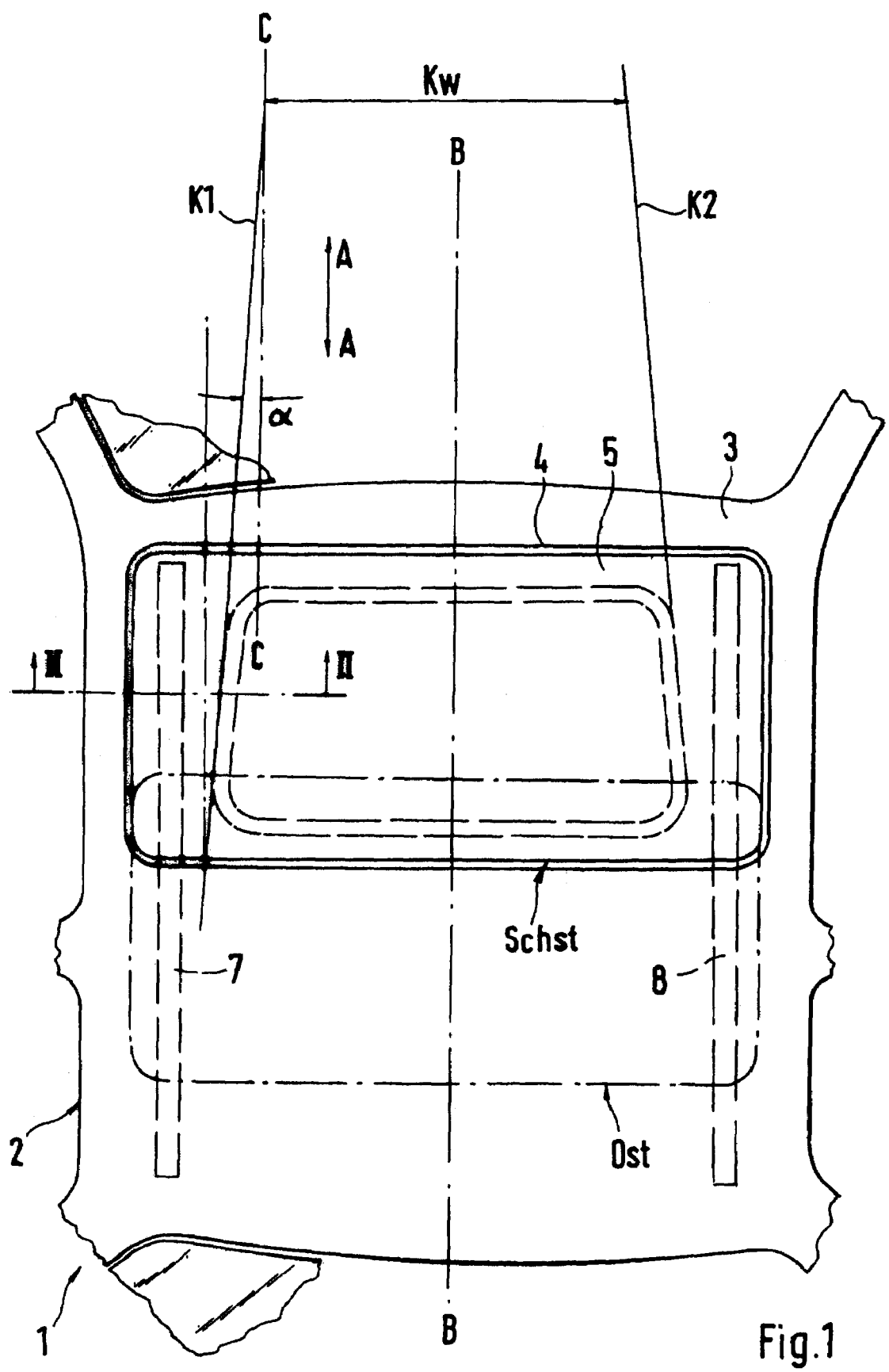
FIG. 1 illustrates a top view of a slidable roof panel for closing and opening a roof opening formed in the roof of a motor vehicle in accordance with an embodiment of the present invention.
Figure 2:
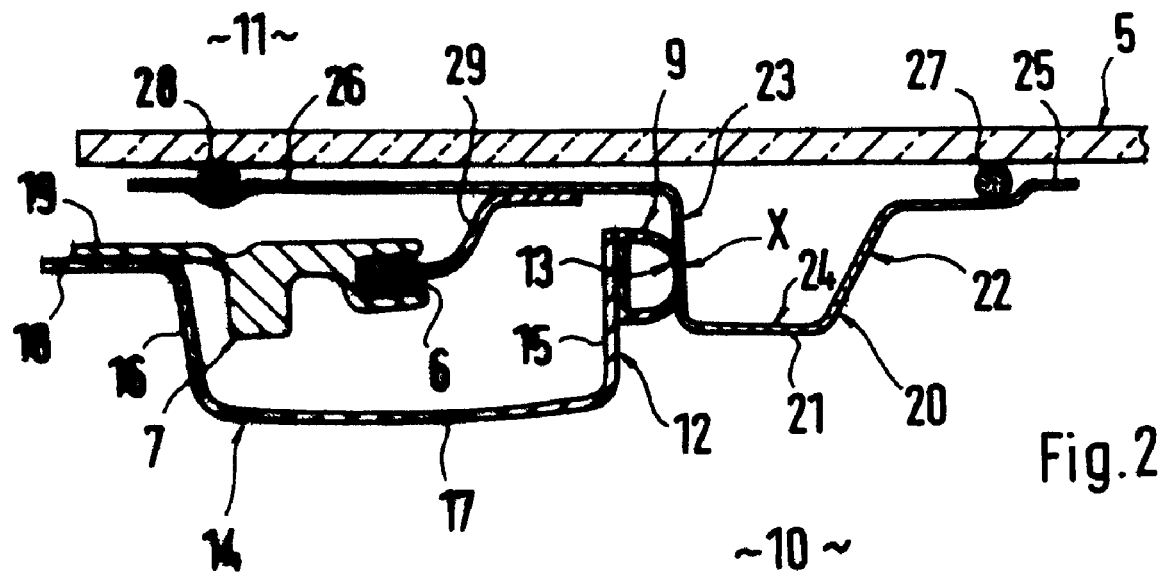
FIG. 2 illustrates an enlarged cross-sectional view of a side of the roof panel and the corresponding side of the roof along line II-II in FIG. 1.
Figure 3:
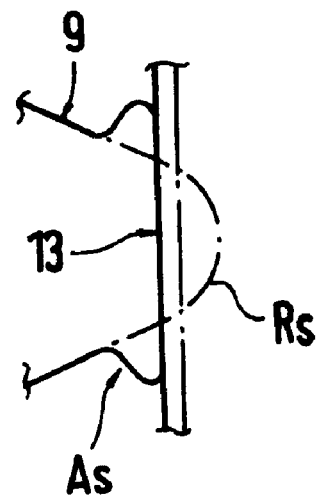
FIG. 3 illustrates an enlarged view of detail "X" in FIG. 2.

With reference to FIGS. 1, 2, and 3, a slidable roof panel 5 for closing and opening a roof opening 4 of a motor vehicle 1 in accordance with an embodiment of the present invention will now be described.

Referring now to FIG. 1, a top view of a portion of vehicle 1 is shown. Vehicle 1 includes a vehicle body 2 having a roof 3. Roof opening 4 is formed within roof 3. Roof opening 4 is generally located in a front portion of roof 3 as viewed along the direction of forward vehicle travel.

Roof panel (i.e., cover) 5 is integrated into roof 3. Roof panel 5 is slidingly displaceable (i.e., movable) in either longitudinal vehicle direction A-A such that roof panel 5 is able to close (i.e., cover) roof opening 4 and open (i.e., expose) roof opening 4. The solid line of roof panel 5 in FIG. 1 indicates the closed position of roof panel 5 when roof panel 5 closes roof opening 4. As indicated, roof panel 5 is located in the front portion of roof 3 when roof panel 5 is in the closed position. The dashed line of roof panel 5 in FIG. 1 indicates the opened position of roof panel 5 when roof panel 5 opens roof opening 4. As indicated, roof panel 5 is located in the rear portion of roof 3 when roof panel 5 is in the opened position. Roof panel 5 is contained in a space provided within roof 3 when roof panel 5 is in its opened position.

Referring now to FIG. 2, with continual reference to FIG. 1, roof panel 5 includes a pair of guide elements 6 located on respective sides of roof panel 5. FIG. 2 illustrates one side of roof panel 5 and the corresponding side of roof 3. As such, one of guide elements 6 of roof panel 5 is illustrated in FIG. 2. It is to be appreciated that the other side of roof panel 5 is similarly configured with a guide element 6. Roof 3 includes a pair of guide rails 7, 8 located on respective sides of roof 3. Guide rails 7, 8 are attached to vehicle body 2 and run parallel to a center longitudinal plane B-B of vehicle 1. Guide elements 6 of roof panel 5 respectively engage guide rails 7, 8 of roof 3 to enable roof panel 5 to slide in either longitudinal vehicle direction A-A such that roof panel 5 closes and opens roof opening 4.

A sealing body 9 is between roof panel 5 and vehicle body 2 on each side of roof panel 5 and the corresponding side of roof 3. As FIG. 2 illustrates one side of roof panel 5 and the corresponding side of roof 3, only a first sealing body 9 is illustrated in FIG. 2. It is to be appreciated that the other side of roof panel 5 and the other corresponding side of roof 3 is similarly configured with a second sealing body 9. Each sealing body 9 functions to ensure that a passenger compartment 10 in vehicle 1 is substantially protected from penetration of undesired media from an exterior 11 surrounding vehicle 1.

As shown in FIG. 2, first sealing body 9 is between a first sealing section 12 and a second sealing section 13. First sealing section 12 is fixedly connected to vehicle body 2. Second sealing section 13 is attached to roof panel 5. Sealing sections 12, 13 are vertically, preferably perpendicularly, oriented as shown in FIG. 2. It is to be appreciated that second sealing body 9 between roof panel 5 and vehicle body 2 is similarly configured between another pair of sealing sections 12, 13.

Each sealing body 9 assumes either a working position As or a resting position Rs by displacement of roof panel 5 in the longitudinal vehicle direction A-A along guide rails 7, 8 (which accommodate respective guide elements 6 of roof panel 5) and by a targeted edge effect KW (see FIG. 1) produced by wedge lines K1, K2 respectively enclosed by each pair of sealing sections 12, 13.

Referring now to FIG. 3, with continual reference to FIGS. 1 and 2, the working position As and the resting position Rs of first sealing body 9 is illustrated. More particularly, the solid line of first sealing body 9 in FIG. 3 indicates the working position As of first sealing body 9; and the dashed line of first sealing body 9 in FIG. 3 indicates the resting position Rs of first sealing body 9.

Each sealing body 9 is in its working position As when roof panel 5 is in the closed position "Schst" covering roof opening 4. Each sealing body 9 is in its resting position Rs when roof panel 5 is in the opened position "Ost" opening roof opening 4.

As indicated, first sealing section 12 associated with first sealing body 9 is fixedly connected to vehicle body 2. First sealing section 12 associated with first sealing body 9 extends along wedge line K1. As indicated, second sealing section 13 associated with first sealing body 9 is attached to roof panel 5. Second sealing section 13 associated with first sealing body 9 is aligned parallel to wedge line K1. As viewed from above roof panel 5, second sealing section 13 associated with first sealing body 9 is aligned at an acute angle α' with respect to a first longitudinal plane C-C. First longitudinal plane C-C extends parallel to center longitudinal plane B-B. The angle α' may be freely chosen within design limits, although favorable design and function requirements are met when this angle is between 0.5° and 3°.

Similarly, first sealing section 12 associated with second sealing body 9 is fixedly connected to vehicle body 2. First sealing section 12 associated with second sealing body 9 extends along wedge line K2. Second sealing section 13 associated with second sealing body 9 is attached to roof panel 5. Second sealing section 13 associated with second sealing body 9 is aligned parallel to wedge line K2. As viewed from above roof panel 5, second sealing section 13 associated with second sealing body 9 is aligned at the acute angle α' with respect to a second longitudinal plane extending parallel to center longitudinal plane B-B.

First sealing body 9 is held in position on its associated first sealing section 12. The associated first sealing section 12 is a component of a support 14 of vehicle body 2. The associated first sealing section 12 has an approximately U-shaped basic shape with vertical legs 15, 16 and a horizontal bar 17. Leg 15 forms the associated first sealing section 12 to which first sealing body 9 is held in position. A horizontal support flange 18 leads away from leg 16 of support 14 and bears a connecting section 19 for guide rail 7. Second sealing body 9 and its associated first sealing section 12 on the other side of roof panel 5 and its corresponding side of vehicle body 2 is similarly configured.

Second sealing section 13 associated with first sealing body 9 is connected to an inner support structure 20 of roof panel 5. Inner support structure 20 may be made of transparent glass. Inner support structure 20 includes a U-shaped support section 21. Support section 21 includes legs 22, 23 and a horizontal bar 24. An inner support flange 25 and an outer support flange 26 respectively lead away from legs 22, 23. Adhesive bodies 27, 28 are respectively provided between support flanges 25, 26 and roof panel 5. Second sealing section 13 associated with second sealing body 9 on the other side of roof panel 5 and its corresponding side of vehicle body 2 is similarly configured.

An angled element 29 having a Z shape is attached to outer support flange 26 by welding, gluing, or the like. A free end of angled element 29 is provided with a sliding profile, made of a suitable material, which projects into a U-shaped guide receptacle in guide rail 7. Another similarly configured angled element 29 projects into a U-shaped guide receptacle in guide rail 8.

While embodiments of the present invention have been illustrated and described, it is not intended that these embodiments illustrate and describe all possible forms of the present invention. Rather, the words used in the specification are words of description rather than limitation, and it is understood that various changes may be made without departing from the spirit and scope of the present invention.

What is claimed is:

1. A roof panel assembly for a vehicle, the roof panel assembly comprising:

a roof panel having front and rear transversely extending sides, first and second longitudinally extending sides, and first and second guide elements respectively located on the first and second sides of the roof panel, the guide elements respectively engageable to first and second longitudinally extending guide rails attached to respective first and second longitudinally extending sides of a roof of a vehicle to enable the roof panel, with the front panel side leading, to slide along a longitudinal vehicle direction toward a roof opening between the first and second sides of the roof to close the roof opening and to enable the roof panel, with the rear panel side leading, to slide along an opposite longitudinal vehicle direction away from the roof opening to open the roof opening;

first and second sealing bodies;

first and second pairs of first and second sealing sections;

wherein the first sealing section of the first pair of sealing sections is fixedly connectable to the first side of the roof and the second sealing section of the first pair of sealing sections is connected to the first side of the roof panel, wherein the sealing sections of the first pair of sealing sections enclose a first wedge line extending from a first point in front of the front panel side at a first acute angle with respect to a first longitudinal vehicle plane which is on the first panel side and extends parallel to the longitudinal vehicle directions through the first point, wherein the second sealing section of the first pair of sealing sections extends at the first acute angle along the first panel side from the front panel side to the rear panel side;

wherein the first sealing section of the second pair of sealing sections is fixedly connectable to the second side of the roof and the second sealing section of the second pair of sealing sections is connected to the second side of the roof panel, wherein the sealing sections of the second pair of sealing sections enclose a second wedge line extending from a second point in front of the front panel side at a second acute angle with respect to a second longitudinal vehicle plane which is on the second panel side and extends parallel to the longitudinal vehicle directions through the second point, wherein the second sealing section of the second pair of sealing sections extends at the second acute angle along the second panel side from the front panel side to the rear panel side;

wherein the first sealing body is mounted on one of the sealing sections of the first pair of sealing sections and the second sealing body is mounted on one of the sealing sections of the second pair of sealing sections;

wherein the sealing bodies assume a working position when the roof panel closes the roof opening in response to a wedge effect generated by the wedge lines as the roof panel slides along the guide rails toward the roof opening, wherein the sealing bodies assume a resting position when the roof panel opens the roof opening;

wherein the second sealing section of the first pair of sealing sections is a component of a first inner support structure of the roof panel, and the second sealing section of the second pair of sealing sections is a component of a second inner support structure of the roof panel;

wherein the first inner support structure has an angular element whose free end together with a sliding profile projects into a U-shaped guide receptacle in the first guide rail;

wherein the second inner support structure has an angular element whose free end together with a sliding profile projects into a U-shaped guide receptacle in the second guide rail.

2. The roof panel assembly of claim 1 wherein:
the first sealing section of the first pair of sealing sections is fixedly connectable to the first side of the roof adjacent to the first guide rail and the first sealing section of the second pair of sealing sections is fixedly connectable to the second side of the roof adjacent to the second guide rail.

3. The roof panel assembly of claim 1 wherein:
each acute angle is between 0.5° and 3°.

4. The roof assembly of claim 1 wherein:
the first sealing section of the first pair of sealing sections is a component of a first support connected to the body of the vehicle, and the first sealing section of the second pair of sealing sections is a component of a second support connected to the body of the vehicle.

5. The roof panel assembly of claim 4 wherein:
each support is generally U-shaped.

6. The roof panel assembly of claim 4 wherein:
the first support is mounted to the first guide rail and the second support is mounted to the second guide rail.

* * * * *